Patented Jan. 16, 1951

2,538,728

UNITED STATES PATENT OFFICE 2,538,728

COMPOSITION FOR CONTROL OF MITE AND INSECT PESTS

Eugene E. Kenaga, Midland, Mich., assignor to The Dow Chemical Company, Midland, Mich., a corporation of Delaware No Drawing. Application August 4, 1949, Serial No. 108,653

5 Claims. (Cl. 167—30)

This invention relates to parasiticides and is particularly concerned with a composition including as active toxicants 1,1-di(4-chlorophenyl)-2,2,2-trichloroethane and the 4-chlorophenyl ester of 4-chlorobenzene sulfonic acid.

In recent years, 1,1-di(4-chlorophenyl)-2,2,2-trichloroethane (DDT) has been widely employed for the control of a large variey of agricultural and household pests. In conventional operations with this material, there has been observed, however, such a specificity of toxic action as seriously interferes with its employment in large agricultural operations. Thus, the compound has been found singularly specific in its failure to control mites and certain aphids while killing off the parasites and predators which normally operate to keep infestations of these organisms within reasonable bounds. The widespread use of the material has generally favored an upset in biological balance, whereby mites and aphids have become a problem in many areas where they were previously of small importance. The need for an improved 1,1-di(4-chlorophenyl)-2,2,2-trichloroethane composition which will control mites and aphids is evident.

According to this invention, it has been discovered that 1,1-di(4-chlorophenyl)-2,2,2-trichloroethane may be combined with the 4-chlorophenyl ester of 4-chlorobenzene sulfonic acid to obtain a parasiticide composition having very desirable properties for the control of plant parasites. In such mixture, the toxicants are mutually activating so that a greater than additive or synergistic result is accomplished, particularly as regards mite and spider mite control. The mixture of toxicants permits the utilization of reduced amounts of 1,1-di(4-chlorophenyl)-2,2,2-trichloroethane and 4'-chlorophenyl 4-chlorobenzene sulfonate and the achievement of results superior to those obtainable with either material alone. A further advantage resides in the prolonged residual effect exerted by the mixture. Thus a single application of the mixture compounded with a suitable carrier gives excellent control of such organisms as *Tetranychus bimaculatus* (two-spotted spider mite), *Bryobia praetiosa* (clover mite), and *Paratetranychus pilosus* (European red mite) for periods ranging up to several months.

In operating in accordance with the present invention, any suitable amount of 1,1-di(4-chlorophenyl)-2,2,2-trichloroethane may be employed in combination with 4'-chlorophenyl 4-chlorobenzene sulfonate to obtain compositions in which the toxicants are mutually activating. The exact amounts of the toxicants in the mixture do not appear to be critical. The preferred proportions are dependent upon the type of composition in which the mixture of toxicants is applied, the organism concerned, and the period for which the residual action and control is desired. Ordinarily, from about 1 to 20 parts by weight of 1,1-di(4-chlorophenyl)-2,2,2-trichloroethane is employed with each 10 parts of 4'-chlorophenyl 4-chlorobenzene sulfonate. In spray compositions, the proportions of the toxicants and dosages applied should be so integrated that the content of 1,1-di(4-chlorophenyl)-2,2,2-trichloroethane is at least 0.1 pound and the content of 4'-chlorophenyl 4-chlorobenzene sulfonate is at least 0.1 pound per 100 gallons. The exact amounts employed are determined by the organism to be controlled and the tolerance of the host plant for the toxicant mixture. In dusts, good results are obtained with compositions containing from 1 to 10 per cent by weight of the mixture of toxicants. With either sprays or dusts, a uniform and thorough coverage of all plant surfaces is desirable. In concentrates, the mixture of toxicants may constitute from about 5 to 95 per cent by weight of the ultimate composition.

It is to be understood that either component may be employed in excess of the indicated preferred proportion. In such a composition the excess of either toxicant in no way detracts from the improved results obtainable with the basic synergistic mixture.

The new toxicant mixtures may be employed with an inert material as a carrier, e. g. water, a finely divided solid, a solvent liquid of organic origin, a wetting and dispersing agent, an aqueous emulsion, and any suitable combination of any of these.

In the preparation of sprays, the 1,1-di(4-chlorophenyl)-2,2,2-trichloroethane and 4'-chlorophenyl 4-chlorobenzene sulfonate may be separately dispersed in the water or other liquid carrier. Alternatively, the toxicants may be mixed one with the other and the resulting mixture dispersed in the carrier. Another mode of operation includes grinding and mixing the toxicants with bentonite, fuller's earth, or talc and dispersing the resulting mixture in water. Any compatible wetting or dispersing agent may be employed in the spray compositions.

In the preparation of dusts, the mixture of toxicants may be mixed with the finely divided carrier in any suitable manner. Operable carriers include volcanic ash, diatomaceous earth, pyrophyllite, clays, talc, wood flour and the like.

Where a concentrate is desired, the 1,1-di(4-chlorophenyl)-2,2,2-tricholorethane and 4'-chlorophenyl 4-chlorobenzene sulfonate may be ground or otherwise dispersed with wetting and dispersing agents to obtain products adapted to be dispersed in water or other aqueous spray composition. Alternatively, the toxicants may be separately compounded in concentrate form and mixed together upon dilution in the spray tank or otherwise.

Wetting and dispersing agents adapted to be employed in the various compositions as suggested above include dioctyl sodium sulfosuccinate (Aerosol OT), sodium lauryl sulphate, alkyl aryl sulfonate (Nacconol NR), alkylated aryl polyether alcohol (Triton X100), polyoxyethylene sorbitol oleate-laurate (Atlox 1045A), and polyoxyethylene derivative of sorbetan trioleate (Tween 85). Other conventional additaments may be employed provided only that such agent accomplish the end desired and not be reactive with the other ingredients of the composition so as to reduce their effectiveness.

4'-chlorophenyl 4-chlorobenzene sulfonate is a white crystalline solid melting at 81°–83° C., and having the following formula:

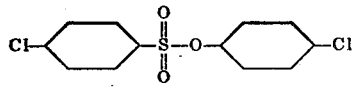

The following examples illustrate the invention but are not to be considered as limiting:

Example 1

A parasiticide composition was prepared in the form of a wettable powder by grinding and mixing 50 parts by weight of 4'-chlorophenyl 4-chlorobenzene sulfonate, 47 parts of fuller's earth, 1 part of Nacconol NR, and 2 parts of a compounded substituted benzoic alkyl sulfonic acid (Daxad No. 27). This composition is hereinafter referred to as "concentrate A."

Concentrate A and a commercial DDT concentrate composition (consisting of 25 parts by weight of 1,1-di(4-chlorophenyl)-2,2,2-trichloroethane, 68 parts of a highly aromatic oil of petroleum origin characterized by a boiling range of 370° to 534° F., 3.8 parts of refined kerosene, and 3.2 parts of a dimeric alkylated aryl polyether alcohol (Triton X155)) were dispersed in water to produce spray compositions having the following concentrations of toxicants per 100 gallons. The latter commercial concentrate is hereinafter referred to as "concentrate B."

No. 1. 2 pounds of 1,1-di(4-chlorophenyl)-2,2,2-trichloroethane.

No. 2. 2 pounds of 4'-chlorophenyl 4-chlorobenzene sulfonate.

No. 3. 2 pounds of 1,1-di(4-chlorophenyl)-2,2,2-trichloroethane and 2 pounds of 4'-chlorophenyl 4-chlorobenzene sulfonate.

No. 4. 1 pound of 1,1-di(4-chlorophenyl)-2,2,2-trichloroethane and 1 pound of 4'-chlorophenyl 4-chlorobenzene sulfonate.

The four spray compositions were applied to groups of mature cranberry bean plants which were infested with the adult two-spotted spider mites. Three days after the application of the spray compositions, the plants were examined to ascertain the degree of control of two-spotted spider mites, and the following situation, expressed in per cent kill, was found to exist:

| Composition: | Per cent kill |
|---|---|
| No. 1 | 66 |
| No. 2 | 26 |
| No. 3 | 100 |
| No. 4 | 100 |

Example 2

Concentrates A and B were dispersed in water to prepare a similar set of spray compositions having the following concentrations per 100 gallons of spray mixture:

No. 1. ¼ pound of 1,1-di(4-chlorophenyl)-2,2,2-trichloroethane.

No. 2. 2 pounds of 4'-chlorophenyl 4-chlorobenzene sulfonate.

No. 3. ¼ pound of 1,1-di(4-chlorophenyl)-2,2,2-trichloroethane and 2 pounds of 4'-chlorophenyl 4-chlorobenzene sulfonate.

No. 4. ⅛ pound of 1,1-di(4-chlorophenyl)-2,2,2-trichloroethane and 1 pound of 4'-chlorophenyl 4-chlorobenzene sulfonate.

These spray compositions were applied to groups of nasturtium plants which were heavily infested with aphids. At the end of 72 hours the nasturtium plants were examined and the following percentage kills observed:

| Composition: | Per cent kill |
|---|---|
| No. 1 | 0 |
| No. 2 | 0 |
| No. 3 | 100 |
| No. 4 | 100 |

Example 3

4'-chlorophenyl 4-chlorobenzene sulfonate and sodium lauryl sulphate were mixed in a ball mill to prepare a concentrate composition containing 32.5 per cent by weight of toxicant. This composition and concentrate B were dispersed in water to prepare spray compositions having the following toxicant concentrations per 100 gallons:

No. 1. 0.25 pound of 1,1-di(4-chlorophenyl)-2,2,2-trichloroethane.

No. 2. 0.25 pound of 4'-chlorophenyl 4-chlorobenzene sulfonate.

No. 3. 0.25 pound of 1,1-di(4-chlorophenyl)-2,2,2-trichloroethane and 0.25 pound of 4'-chlorophenyl 4-chlorobenzene sulfonate.

These sprays were employed for the control of Mexican bean beetle on mature cranberry bean plants. In such operations, the indicated toxicant compositions were applied to the bean plant foliage, the leaf surfaces allowed to dry, and the plants then infested with a known number of insect larvae. Three days after infestation, the plants were examined to ascertain the control of Mexican bean beetles that had been obtained. The following situation, expressed in percentage kill was observed:

| Concentration: | Per cent kill |
|---|---|
| No. 1 | 10 |
| No. 2 | 10 |
| No. 3 | 70 |

Example 4

40 parts by weight of 4'-chlorophenyl 4-chlorobenzene sulfonate, 56.5 parts of fuller's earth, 2 parts of Daxad No. 27, and 1.5 parts Nacconol NR were mixed and ground together to prepare a wettable powder concentrate identified as "concentrate C."

A commercial DDT concentrate and concentrate C both alone and in combination, were applied in aqueous dispersion to bearing apple trees. The commercial DDT concentrate shall hereinafter be known as "concentrate D" and consisted of 50 parts by weight of 1,1-di(4-chlorophenyl)-2,2,2-trichloroethane, 46.4 parts of fuller's earth, 2 parts of Daxad No. 27, and 1.6 parts of Triton X100. The apple trees had built up a heavy summer population of mixed two-spotted spider mite and European red mite which threatened to interfere with the development of the crop. Two applications of the spray compositions were made, the first on June 24 and the second on July 6. The sprays were applied with conventional spray rigs and in such quantity as to provide for run-off from the treated leaf, branch, and trunk surfaces. Unsprayed check plots were scattered thru the orchard to provide a continuous source of reinfestation. The following table sets forth the amounts of materials employed and the mite counts obtained in the samplings of the leaves of the treated trees:

| Pound Concentrate Per 100 gallons of spray | | Average number of mites per 50 leaves On July 22 |
|---|---|---|
| Composition C | Composition D | |
| 0 | 1 | 3,800 |
| 3½ | 0 | 20 |
| 1¼ | 1 | 0 |
| 0 (check) | 0 | 3,800 |

I claim:

1. A composition for the control of mite and insect pests comprising as active toxic ingredients (1) 1,1-di(4-chlorophenyl)-2,2,2-trichloroethane and (2) 4-chlorophenyl ester of 4-chlorobenzene sulfonic acid, the active toxic ingredients of such composition being mutually activating.

2. A composition for the control of mite and insect pests comprising as active toxic ingredients from 1 to 20 parts by weight of 1,1-di(4-chlorophenyl)-2,2,2-trichloroethane for each 10 parts of the 4-chlorophenyl ester of 4-chlorobenzene sulfonic acid, the active toxic ingredients of such composition being mutually activating.

3. A composition for the control of mite and insect pests comprising a carrier and dispersed therein as active toxic ingredients from 1 to 20 parts by weight of 1,1-di(4-chlorophenyl)-2,2,2-trichloroethane for each 10 parts of the 4-chlorophenyl ester of 4-chlorobenzene sulfonic acid, the active toxic ingredients of such composition being mutually activating.

4. A composition for the control of mite and insect pests comprising an inert liquid carrier and dispersed therein as active toxic ingredients from 1 to 20 parts by weight of 1,1-di(4-chlorophenyl)-2,2,2-trichloroethane for each 10 parts of the 4-chlorophenyl ester of 4-chlorobenzene sulfonic acid, the active toxic ingredients of such composition being mutually activating.

5. A spray composition for the control of mite and insect pests comprising an aqueous carrier and dispersed therein as active toxic ingredients from 1 to 20 parts by weight of 1,1-di(4-chlorophenyl)-2,2,2-trichloroethane for each 10 parts of the 4-chlorophenyl ester of 4-chlorobenzene sulfonic acid, the active toxic ingredients in such composition being mutually activating and each being present in the amount of at least 0.1 pound per 100 gallons of spray.

EUGENE E. KENAGA.

REFERENCES CITED

The following references are of record in the file of this patent:

UNITED STATES PATENTS

| Number | Name | Date |
|---|---|---|
| Re. 22,922 | Muller | Sept. 30, 1947 |
| 2,148,928 | Meuron | Feb. 28, 1939 |
| 2,430,586 | Ruthruff | Nov. 11, 1947 |
| 2,444,752 | Siegler | July 6, 1948 |

OTHER REFERENCES

Metcalf, "Acaricidal Properties of Organic Compounds Related to DDT," J. Econ. Ent., vol. 41, No. 6, December 1948, pages 875–882.

Lauger et al., Helv. Chim. Acta, vol 27, pages 892–908.